…

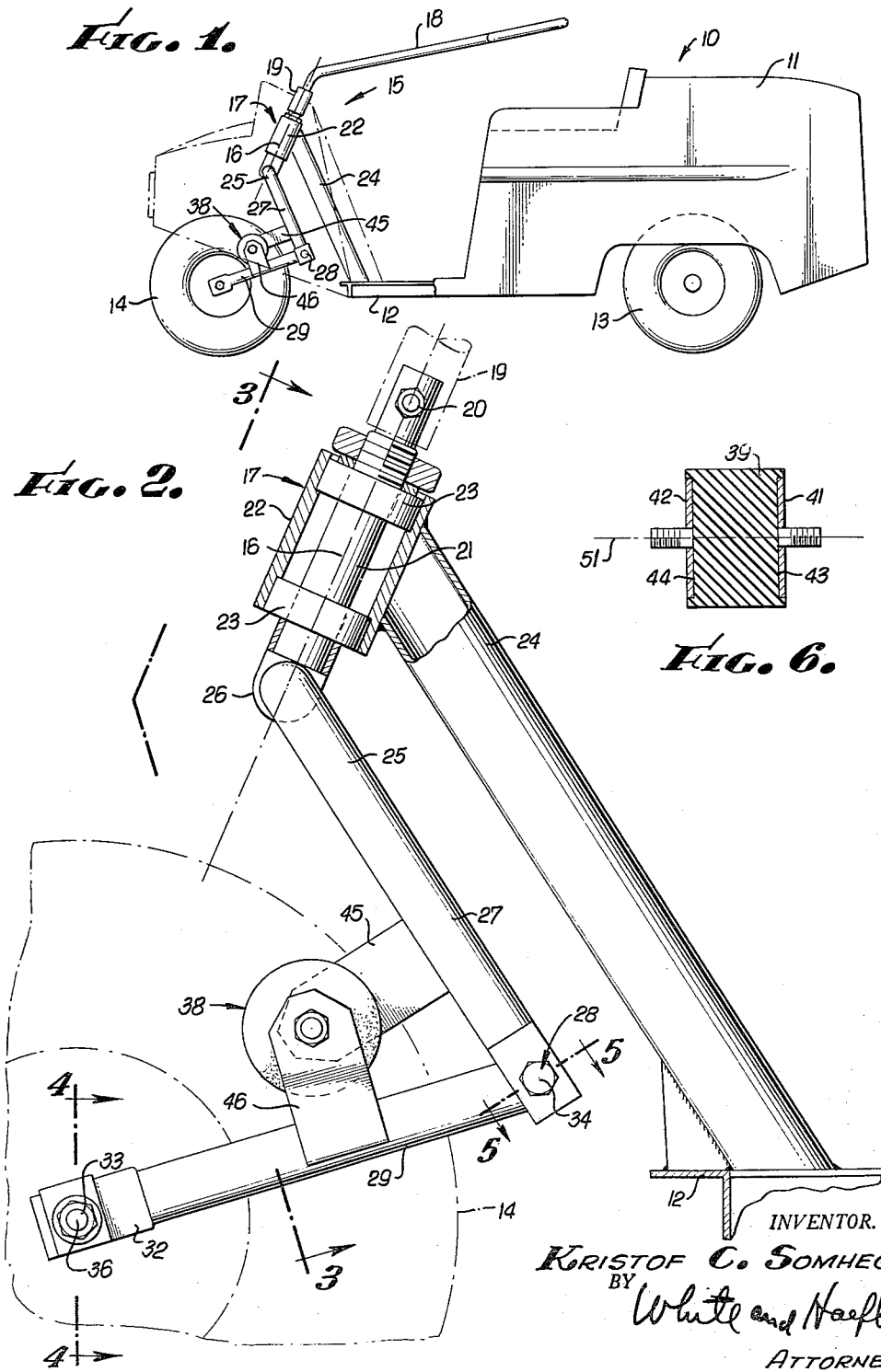

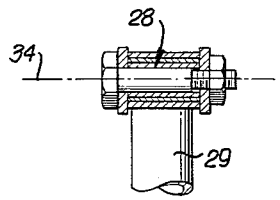
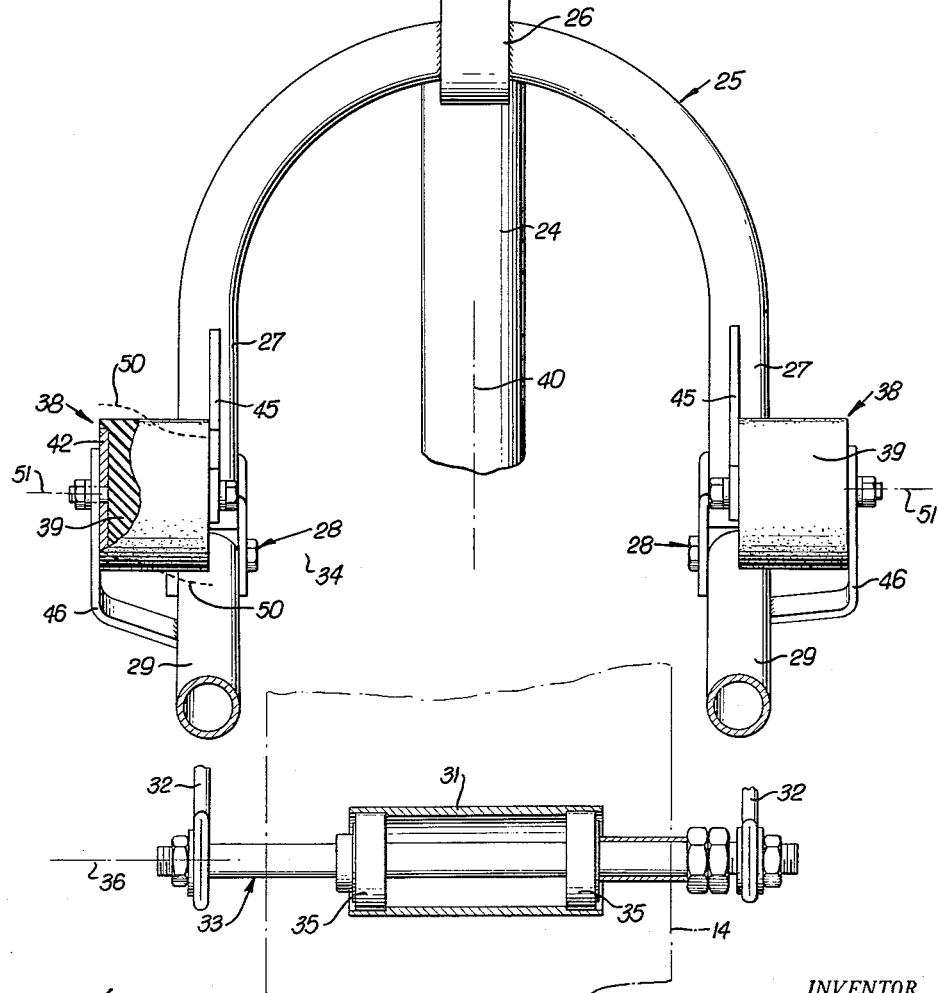

United States Patent Office 3,090,638
Patented May 21, 1963

3,090,638
CART STEERING WHEEL SUSPENSION
Kristof C. Somhegyi, Santa Monica, Calif., assignor to Dynapower Systems Corporation, Los Angeles, Calif., a corporation of Delaware
Filed Apr. 16, 1962, Ser. No. 187,839
6 Claims. (Cl. 280—92)

This invention relates generally to cart suspension apparatus and more particularly concerns steering structure for a cart characterized in that elastomeric body means provides spring cushioning of loading transmitted to the cart steering wheel.

The invention is particularly adapted to golf type carts, generally having two rear wheels and one forward steering wheel, such carts in the past not having to my knowledge the advantages associated with the suspension apparatus forming the present invention. Generally speaking, the suspension apparatus comprises a ground wheel and cart steering structure turnable about a bearing axis for turning the wheel, the structure including a linkage allowing the wheel to move up and down relative to the cart body. A major object of the invention is to provide elastomeric body means carried by the linkage in such a manner that cart imposed loading is transmitted in shear by the body means resisting flexing of the linkage.

More specifically, the cart steering structure includes a fork and links through which cart imposed loading is transmitted to the wheel, the links being pivoted with respect to the fork legs to allow the wheel to move up and down relative to the cart and fork. The elastomeric body means comprises a pair of shear bodies respectively located in such a manner as to resist pivoting of the respective links relative to the fork legs, the links and elastomeric bodies being at opposite sides of the ground wheel.

These and other objects and advantages of the invention, a swell as the details of an illustrative embodiment, will be more fully understood from the following detailed description of the drawings, in which:

FIG. 1 is a side elevation showing the cart and the steering structure;
FIG. 2 is an enlarged fragmentary showing of the steering linkage and elastomeric body means cushioning the linkage action;
FIG. 3 is a section taken on line 3—3 of FIG. 2;
FIG. 4 is a section taken on line 4—4 of FIG. 2;
FIG. 5 is a section taken on line 5—5 of FIG. 2; and
FIG. 6 is a transverse section taken through one of the elastomeric bodies.

Referring first to FIG. 1, the cart 10 is shown to include a body 11 carried by a frame 12, and supported by a pair of rear wheels 13 and a ground engaging front wheel 14. Cart steering structure is shown generally at 15 as being turnable about the axis 16 of a bearing 17 for turning the front wheel 14. Such structure includes a steering handle 18 turned at 19 to connect at 20 with a kingpin 21 passing through the housing 22 of the bearing 17. The latter typically includes in addition the roller or journal bearings 23 retained in the housing and centering the kingpin. In this connection, the bearing housing 22 may be suitably carried by the frame member 24 as better shown in FIG. 2.

The cart steering structure also includes a fork 25 integrally joined to and suspended from the kingpin at the location 26, whereby the fork legs 27 extend downwardly and rearwardly in parallel relation as is clear from FIGS. 2 and 3. Pivotally joined to the lower end portions of the fork legs 27 at the pivot locations 28 are a pair of links 29. The latter project forwardly and at a slight downward angle toward the axis 36 of the wheel 14 and at opposite sides of the wheel hub 31 as is better shown in FIG. 4. The forwardmost portions 32 of the two links 29 are supported by the wheel axle 33 whereby the wheel is allowed to move up and down relative to the cart about a first transverse pivot axis 34 at the pivot location 28.

Reference to FIG. 4 will show that the wheel axle 33 is supported by suitable roller or journal bearings 35 mounted within the housing or hub 31, whereby the axle 33 has a transverse axis 36 extending substantially parallel to the axis 34 previously described. In addition, it will be observed in FIG. 2 that the bearing axis 16 of the kingpin 21 extends generally downwardly to intersect the ground at a point slightly in front of the point at which the wheel touches the ground directly below the wheel axis, whereby the wheel and steering gear tend to straighten out when free of manual control.

In accordance with the invention elastomeric body means generally indicated at 38 is carried by the linkage in such manner that cart imposed loading is transmitted in shear by the body means to resist flexing of the linkage, and specifically to resist pivoting of the links 29 with respect to the fork legs 27. The elastomeric body means comprises a pair of shear bodies 39 typically comprising hard rubber or its equivalent, which are respectively located at opposite sides of a vertical plane 40 normal to the pivot axis 34 bisecting the wheel 14. Each body 39 has connections respectively attached to transversely spaced portions of the body and typically such connections will include plates 41 and 42 suitably bonded to the opposite vertical faces 43 and 44 of the body 39.

The connections may be also understood as including sufficient structure to transmit loading acting between the body 39 and one leg of the fork, with another connection transmitting loading acting between the body 39 and one link 29. Thus, the first connection may be understood as including a lug or extension 45 having one end portion integral with the plate 41 and another end integral with the fork leg 27. Likewise, another lug or extension 46 has one end portion thereof integral with the plate 42 and the other end thereof integral with the link 29, all of which is clear from FIGS. 2 and 3. The extensions 45 and 46 are offset from and at the forward side of axis 34. Also, extensions 45 project generally downwardly and forwardly and extensions 46 project generally upwardly and forwardly.

In operation, as the ground wheel 14 moves upwardly in response to cart imposed loading it follows a generally arcuate path with respect to the transverse pivot axis 34, such movement tending to rotate the links 29 more closely toward the fork legs 27. Such flexing of the linkage is resisted by the elastomeric bodies 39 which are placed in shear as generally indicated by the broken lines 50 in FIG. 3, and accordingly the cushioning action is provided by the shear loading of the two elastomeric bodies 39. In this regard, such shear loading is accompanied by a slight degree of twist of the bodies 39 about their common axis 51 by virtue of the upward rotation of the lugs 46 about the pivot axis 34.

It is found that the arrangement described provides a very effective cart suspension, characterized by its extreme simplicity, ease of steering of the cart, and resulting effective cushioning of the cart imposed loading transmitted to the ground wheel 14.

I claim:
1. Cart suspension apparatus, comprising a ground wheel, cart steering structure turnable about a bearing axis for turning the wheel, said structure including a fork, and links through which cart imposed loading is transmitted to the wheel and pivoted with respect to the respective fork legs and about a first transverse pivot axis to allow the wheel to move up and down relative to the cart and fork, said structure also including extensions respectively integral with the work and at least one link, said extensions projecting into transversely spaced apart and overlapping relation, and elastomeric body means carried by and between transversely spaced portions of said extensions, said portions and said body means being offset from and at one side of said transverse axis so that said portions subject said body to shear in response to said wheel movement, whereby said body transmits only a portion of cart imposed loading and in shear for resisting pivoting of said links with respect to said fork, said body having positions in which essentially all of the resistance to flexing of said linkage is developed in and by the body loaded into shear configuration.

2. The invention as defined in claim 1, in which said wheel has a transverse axis of rotation and said first transverse pivot axis is substantially parallel to said wheel axis and is spaced generally rearwardly from said wheel axis and said extensions.

3. The invention as defined in claim 1, in which said bearing axis extends generally downwardly and forwardly of that point on the wheel directly below the wheel axis.

4. The invention as defined in claim 2, in which said body means comprises a pair of shear bodies respectively located at opposite sides of a plane normal to said pivot axis and bisecting said wheel, each body resisting pivoting of one of said links with respect to a leg of the fork.

5. The invention as defined in claim 4, in which each body has connections respectively attached to said transversely spaced portions of the body, one connection transmitting loading acting between the body and a leg of the fork and the other connection transmitting loading acting between the body and a link.

6. The invention as defined in claim 4, including a cart frame the forward portion of which is supported by said ground wheel, said fork projecting generally downwardly and rearwardly, said links projecting generally forwardly from the pivot axis, said extensions integral with the fork projecting generally downwardly and forwardly, the extensions integral with the links projecting generally upwardly and forwardly.

References Cited in the file of this patent

UNITED STATES PATENTS

| | | |
|---|---|---|
| 2,043,011 | Schjolin | June 2, 1936 |
| 2,170,565 | Macbeth | Aug. 22, 1939 |
| 2,303,568 | McWhorter et al. | Dec. 1, 1942 |
| 2,596,411 | Jordan | May 13, 1952 |
| 2,932,530 | Chapman et al. | Apr. 12, 1960 |
| 2,966,951 | Lang | Jan. 3, 1961 |

FOREIGN PATENTS

| | | |
|---|---|---|
| 953,454 | France | May 23, 1949 |